United States Patent
Hsieh et al.

(10) Patent No.: US 10,262,223 B2
(45) Date of Patent: Apr. 16, 2019

(54) METHOD OF SPEEDING UP IMAGE DETECTION

(71) Applicant: NATIONAL CHUNG SHAN INSTITUTE OF SCIENCE AND TECHNOLOGY, Taoyuan (TW)

(72) Inventors: Chun-Wei Hsieh, Taipei (TW); Shih-Che Chien, Hsinchu (TW); Feng-Chia Chang, Kaohsiung (TW); Chien-Hao Hsiao, Hsinchu (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 30 days.

(21) Appl. No.: 15/628,111

(22) Filed: Jun. 20, 2017

(65) Prior Publication Data

US 2018/0365511 A1 Dec. 20, 2018

(51) Int. Cl.
| | |
|---|---|
| *G06K 9/46* | (2006.01) |
| *G06K 9/66* | (2006.01) |
| *G06K 9/32* | (2006.01) |
| *G06K 9/62* | (2006.01) |

(52) U.S. Cl.
CPC ......... *G06K 9/3241* (2013.01); *G06K 9/6231* (2013.01)

(58) Field of Classification Search
None
See application file for complete search history.

(56) References Cited

U.S. PATENT DOCUMENTS

| | | | |
|---|---|---|---|
| 2002/0003895 A1* | 1/2002 | Some | G06T 7/70 382/132 |
| 2015/0078629 A1* | 3/2015 | Gottemukkula | G06K 9/0061 382/117 |

* cited by examiner

Primary Examiner — Kevin Ky
(74) Attorney, Agent, or Firm — Schmeiser, Olsen & Watts, LLP (57) ABSTRACT

A method of speeding up image detection, adapted to increase a speed of detecting a target image and enhance efficiency of image detection, comprises the steps of capturing an image; retrieving a plurality of characteristic points of the image; creating a region of interest (ROI) centered at the characteristic points each; creating a plurality of search point scan windows corresponding to the ROIs, respectively; calculating target hit scores of the characteristic points and the search point scan windows; comparing the target hit scores of the characteristic points and the search point scan windows to obtain an ROI most likely to have a target image; calculating centroid coordinates of the ROI by a centroid shift weight equation; and narrowing a scope of ROI search according to a location of the centroid coordinates and reducing a displacement between the search points.

3 Claims, 7 Drawing Sheets

METHOD OF SPEEDING UP IMAGE DETECTION

FIELD OF THE INVENTION

The present invention relates to methods of speeding up image detection and, more particularly, to a method of speeding up image detection, characterized in that efficiency of image detection is enhanced by reducing the number of required sampling regions with an importance sampling algorithm based on image characteristic points.

BACKGROUND OF THE INVENTION

Figure 1A:
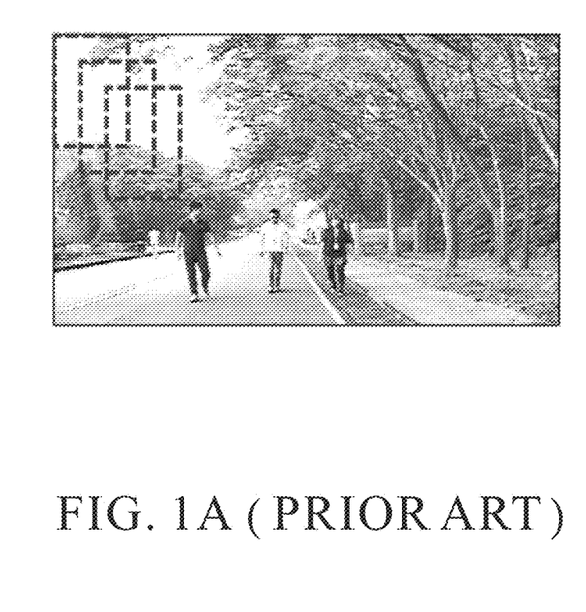
FIG. 1(A) (PRIOR ART) is a picture illustrative of a full-field scan performed on a picture in whole by a conventional image detection technique.
Figure 1B:
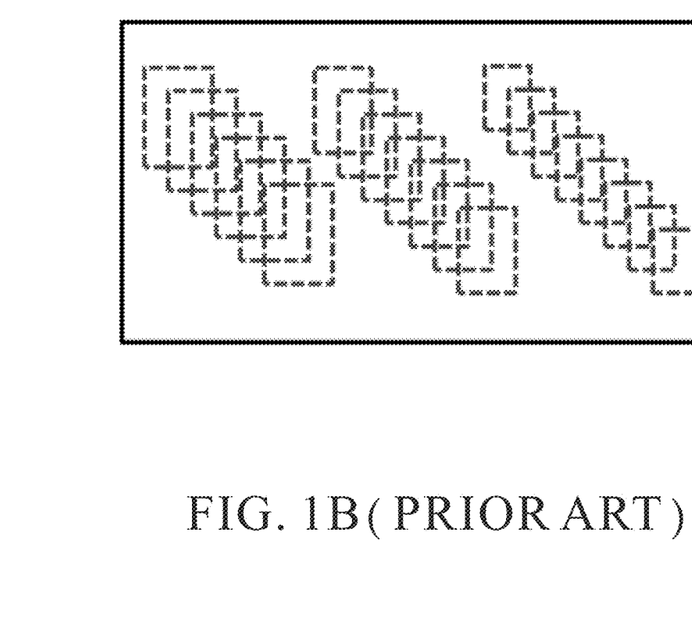
FIG. 1(B) (PRIOR ART) is a schematic view of a large number of scan windows required for the full-field scan illustrated by FIG. 1(A)

Conventional image detection techniques require scanning a picture in its entirety to detect a target image therein. However, the conventional image detection techniques necessitate a large number of scan windows and thus render the system busier to the detriment of its performance, not to mention that it is a waste of time detecting for non-target images. Referring to FIG. 1(A), a conventional image detection technique requires scanning a picture in its entirety to detect a target image therein and thus necessitates a large number of scan windows as shown in FIG. 1(B).

In an attempt to overcome the aforesaid drawback of the prior art, a speeded up robust features (SURF) algorithm was invented and involves retrieving characteristic points from a picture and then performing a block scan on the retrieved characteristic points to detect for a target image. SURF has an advantage: it speeds up image detection, because it does not require scanning the picture in its entirety. However, SURF has a drawback: the block scan performed on the retrieved characteristic points is disadvantaged by the presence of non-target image blocks. As a result, SURF still has room for improvement in terms of efficiency.

SUMMARY OF THE INVENTION

It is an objective of the present invention to enhance efficiency of image detection. A full-field scan is performed on a picture in whole at the cost of image detection efficiency. Characteristic points contained in a typical picture are seldom identical; hence, target images contained in a picture can be accurately located by verifying the vicinity of characteristic points in the picture instead of performing a full-field scan on the picture in whole. In view of this, the present invention provides a method of speeding up image detection. The method of the present invention is based on a SURF algorithm and involves retrieving image characteristic points and then reducing the number of required sampling regions with an importance sampling algorithm based on the image characteristic points, so as to render the system less busy, speed up detection, and enhance detection efficiency, without deteriorating detection accuracy.

In order to achieve the above and other objectives, the present invention provides a method of speeding up image detection, adapted to increase a speed of detecting a target image, comprising the steps of: (1) capturing an image; (2) retrieving a plurality of characteristic points of the image; (3) creating a region of interest (ROI) centered at the characteristic points each; (4) creating a plurality of search point scan windows corresponding to the ROIs, respectively; (5) calculating target hit scores of the characteristic points and the search point scan windows; (6) comparing the target hit scores of the characteristic points and the search point scan windows to obtain an ROI which has a target image; (7) calculating centroid coordinates of the ROI by a centroid shift weight equation; and (8) narrowing a scope of ROI search according to a location of the centroid coordinates and reducing a displacement between the search points.

Regarding the method of speeding up image detection, the step (2) of retrieving a plurality of characteristic points of the image is performed by a speeded up robust features (SURF) algorithm.

Regarding the method of speeding up image detection, the step (5) of calculating the target hit scores of the characteristic points and the search point scan windows is performed by a support vector machine (SVM) algorithm.

Regarding the method of speeding up image detection, the step (7) of calculating centroid coordinates of the ROI by the centroid shift weight equation is performed in accordance with the target hit scores of the characteristic points and the search point scan windows and center coordinates of the characteristic points and the search point scan windows, so as to calculate the centroid coordinates by the centroid shift weight equation.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 2:
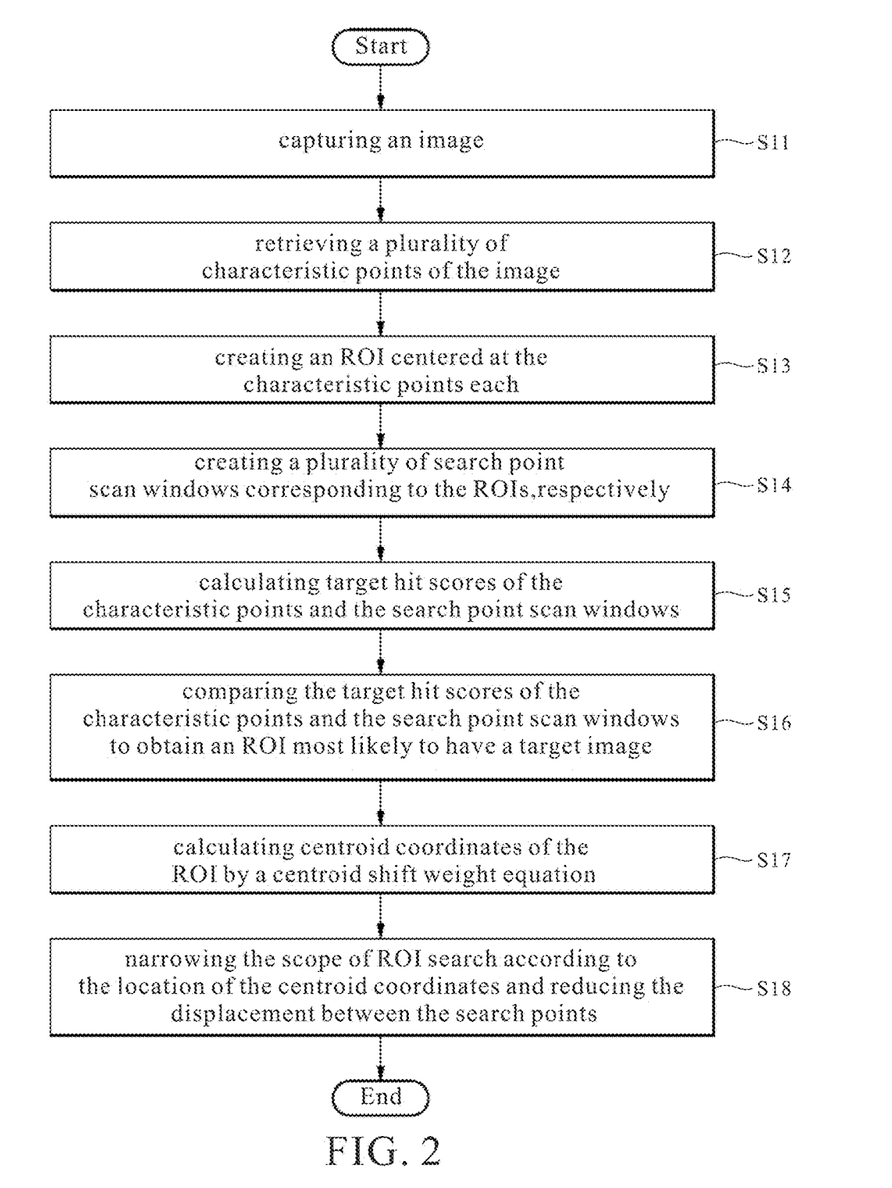
FIG. 2 is a schematic view of the process flow of a method of speeding up image detection according to an embodiment of the present invention.

Referring to FIGS. 2~5, a method of speeding up image detection, provided according to an embodiment of the present invention, comprises steps S11~S18 as follows:

Step S11 involves capturing an image.

Figure 3A:
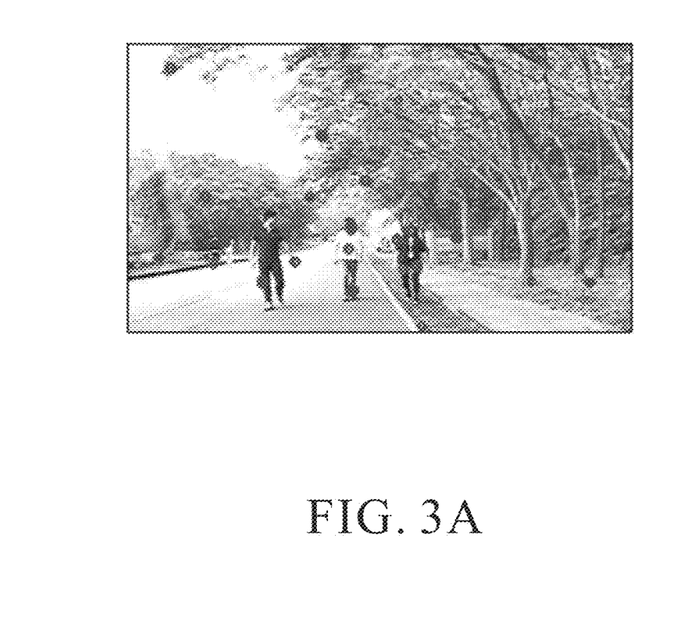
FIG. 3(A) is a picture of retrieved characteristic points of images according to the embodiment of the present invention.

Step S12 involves retrieving a plurality of characteristic points of the image by a speeded up robust features (SURF) algorithm. FIG. 3(A) shows possible target images. In this embodiment, the target images are taken of pedestrians. However, it is feasible that the target images may be configured as needed, for example, to be vehicles or animals.

Step S13 involves creating a region of interest (ROI) centered at the characteristic points each. Referring to FIG. 3(A), in step S13, an ROI centered at each of the characteristic points is created, creating a plurality of ROIs.

Figure 4A:
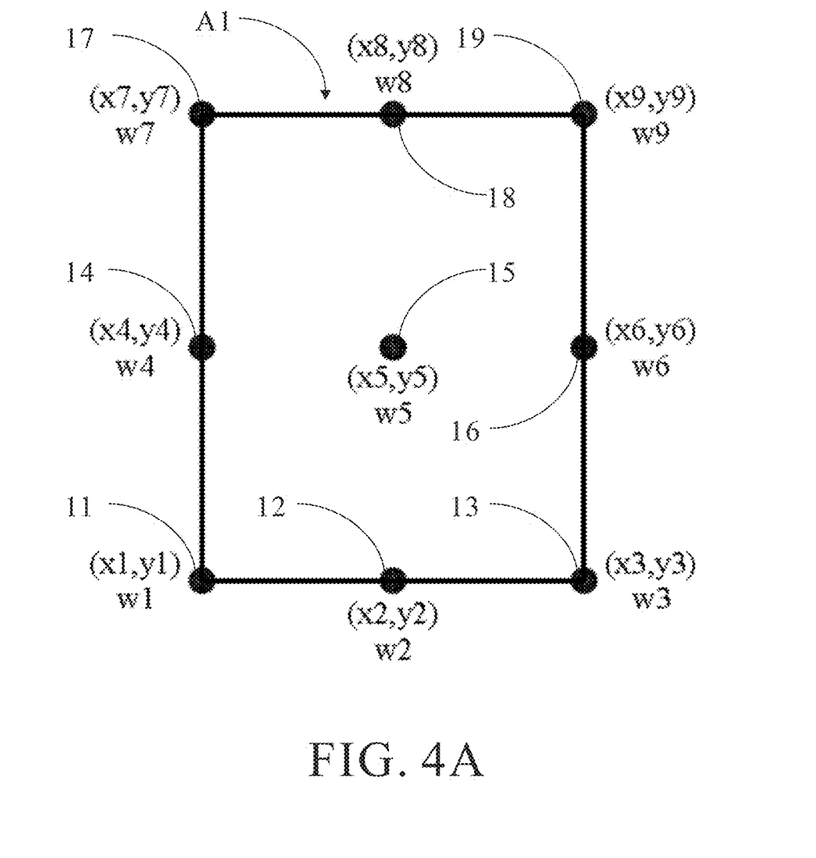
FIG. 4(A)~FIG. 4(C) are schematic views of the process flow of ROI centroid shifting according to the embodiment of the present invention.

Step S14 involves creating a plurality of search point scan windows corresponding to the ROIs, respectively. Referring to FIG. 4, a first ROI A1 centered at a characteristic point 15 is created, and then eight search point scan windows 11, 12, 13, 14, 16, 17, 18, 19 in the vicinity of the characteristic point 15 are created, wherein (x1,y1)~(x4,y4) and (x6,y6)~(x9,y9) denote the center coordinates of the search point scan windows 11, 12, 13, 14, 16, 17, 18, 19, whereas (x5,y5) denotes the coordinates of the characteristic point 15.

Step S15 involves calculating target hit scores of the characteristic points and the search point scan windows by an SVM algorithm. Referring to FIG. 4, w5 denotes the target hit score of the characteristic point 15, whereas w1~w4 and w6~w9 denote the target hit scores of the search point scan windows 11, 12, 13, 14 and 16, 17, 18, 19, respectively.

Figure 3B:
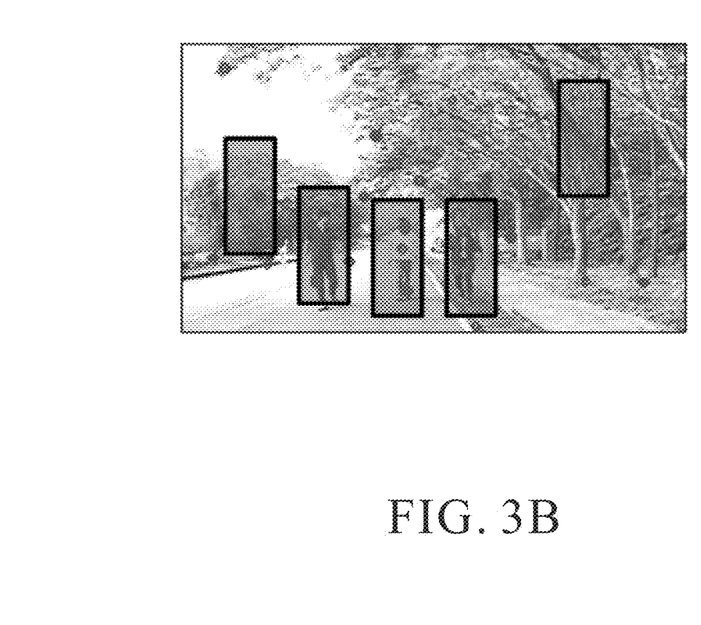
FIG. 3(B) is a picture of an ROI identified to have a target image in accordance with characteristic points of FIG. 3(A)

Step S16 involves comparing the target hit scores of the characteristic points and the search point scan windows to obtain an ROI most likely to have a target image. Referring to FIG. 3(B), the box demarcates the ROI identified, as a result of the comparison of the target hit scores of the characteristic points and the search point scan windows in FIG. 3(A), to be most likely to have a target image.

Step S17 involves calculating centroid coordinates of an ROI by a centroid shift weight equation, wherein the centroid coordinates are calculated by the centroid shift weight equation in accordance with the target hit scores of the characteristic points and the search point scan windows and the center coordinates of the characteristic points and the search point scan windows. The centroid shift weight equation is expressed by equation (1) as follows:

$$\text{Centroid}(x, y) = \frac{\sum_{i=1} w_i(x_i, y_i)}{\sum_{i=1} w_i} \quad (1)$$

Figure 4B:
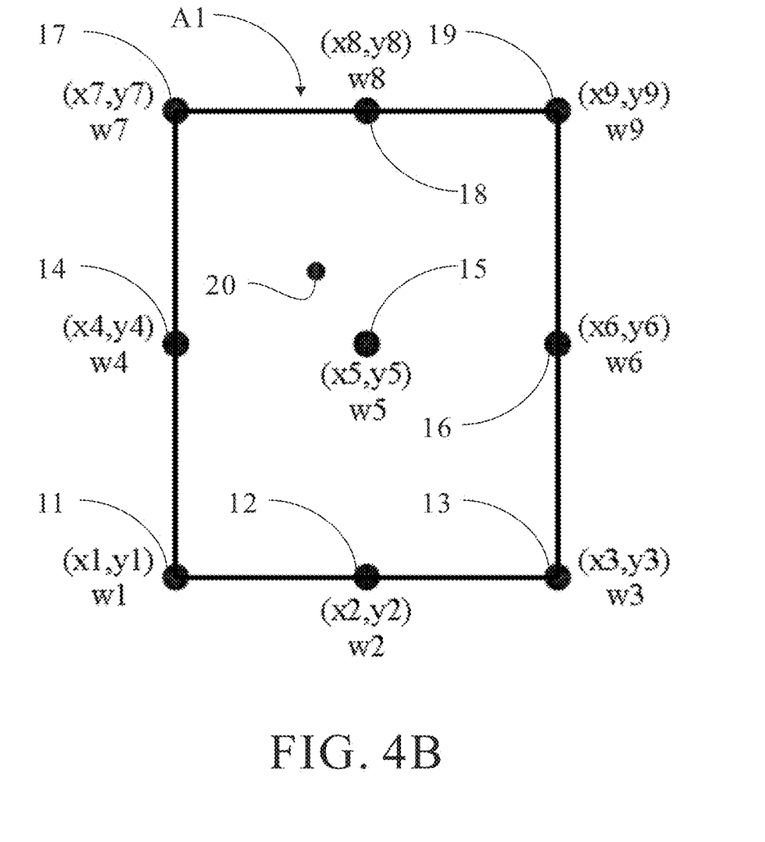

In equation (1), $w_i$ denotes the target hit scores of the characteristic points or the search point scan windows, $(x_i, y_i)$ denotes the center coordinates of the characteristic points or the search point scan windows, and Centroid(x,y) denotes centroid coordinates. Referring to FIG. 4(B), a centroid 20 of the first ROI A1 is calculated by the centroid shift weight equation, i.e., equation (1), in accordance with target hit scores w1~w9 of the characteristic point 15 and the search point scan windows 11, 12, 13, 14 and 16, 17, 18, 19 in the first ROI A1 and center coordinates (x1,y1)~(x9,y9) thereof.

Figure 4C:
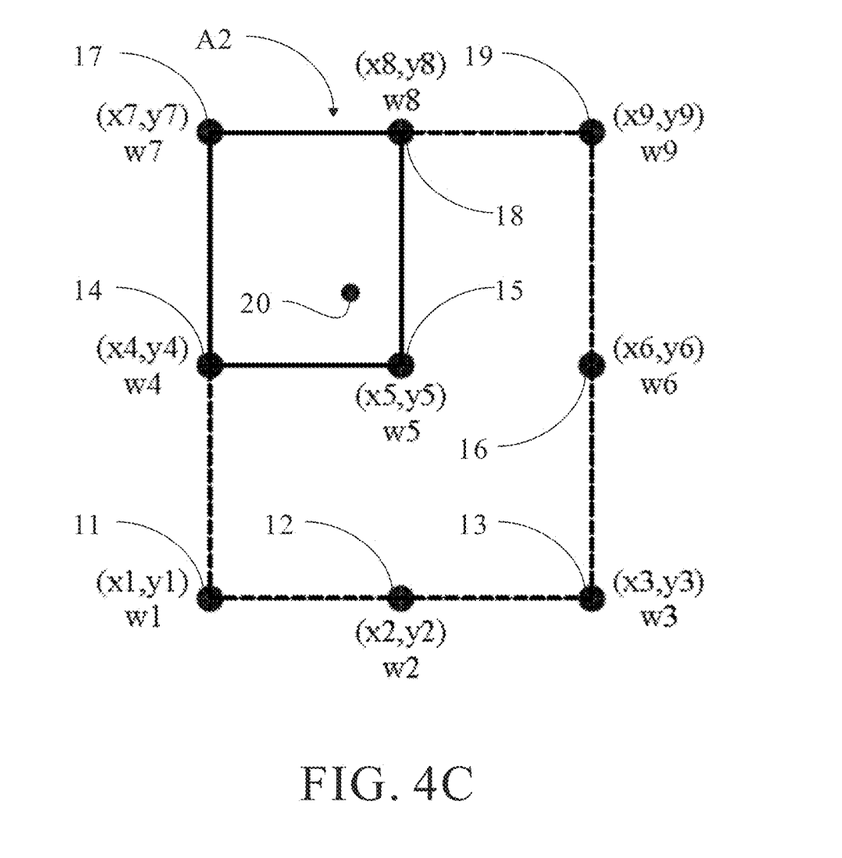
Figure 5A:
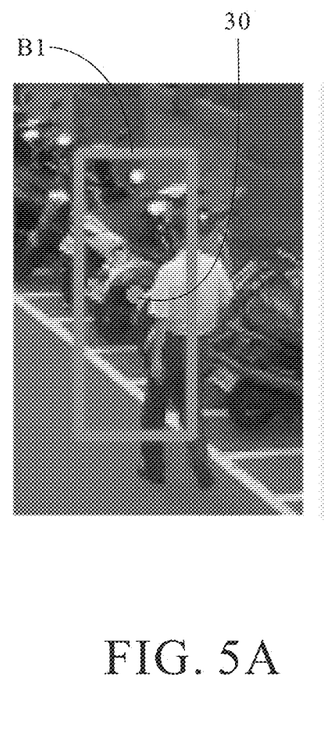
FIG. 5(A)~FIG. 5(D) are pictures of the process flow of ROI centroid shifting according to the embodiment of the present invention.
Figure 5B:
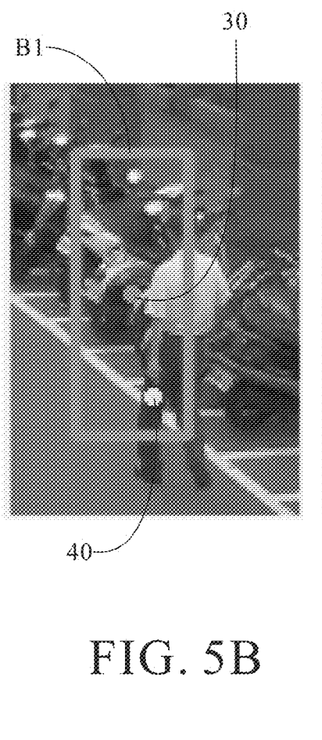
Figure 5C:
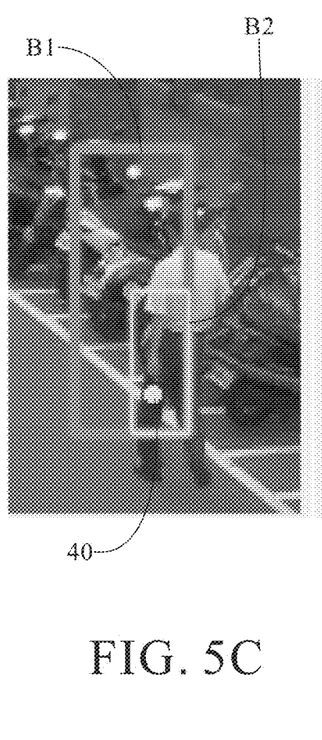
Figure 5D:
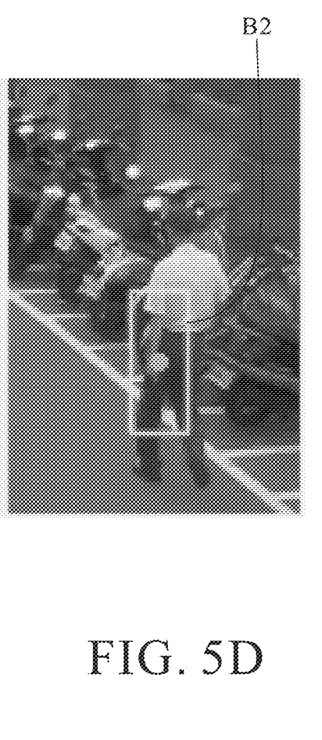

Step S18 involves narrowing the scope of ROI search according to the location of the centroid coordinates and reducing the displacement between the search points. Referring to FIG. 4(C), step S18 entails creating a second ROI A2 in accordance with the search point scan windows 14, 17, 18 and the characteristic point 15, creating a plurality of search point scan windows in accordance with the second ROI A2, calculating the target hit scores of the search point scan windows and the center (not shown) of the second ROI A2, calculating centroid coordinates of the second ROI A2 by the centroid shift weight equation, narrowing the scope of ROI search according to the location of the centroid coordinates and reducing the displacement between the search points. Hence, according to the present invention, the method of speeding up image detection provides a means of conducting a recursive search to approach a target's location, so as to render the system less busy, speed up detection, and enhance detection efficiency greatly.

Referring to FIG. 5, there are shown pictures of the process flow of ROI centroid shifting according to the embodiment of the present invention. The process flow of ROI centroid shifting involves creating an ROI B1 (FIG. 5(A)) centered at a characteristic point 30 after the characteristic point 30 has been identified by a SURF algorithm, creating a plurality of search point scan windows (not shown) in accordance with the ROI B1, calculating the target hit scores of the characteristic point 30 and the search point scan windows, calculating a centroid 40 of the ROI B1 by the centroid shift weight equation, i.e., equation (1) (FIG. 5(B)), narrowing the scope of ROI B1 search according to the location of the centroid 40 and reducing the displacement between the search points to therefore create an ROI B2 (FIG. 5(C)), and repeating the aforesaid steps in accordance with the center of the ROI B2.

Referring to Table 1 below, three tests described below are conducted with conventional test databases (OTCBVS, OTCBVS_2, CAVIAR_medium, CAVIAR_high, PETS_frontview, PETS_sideview) to compare their test results: (1) Full Search: performing a full-field scan on a picture in whole by an image detection method; (2) SURF Local Search: retrieving characteristic points from a picture by a SURF algorithm and then performing a block scan on the retrieved characteristic points to detect for a target image by an image detection method; and (3) Our System: performing the method of speeding up image detection according to the present invention to speed up image search. As indicated by the test results shown in Table 1, regardless of which of the aforesaid databases is used, an image search is conducted faster by the method of speeding up image detection according to the present invention than the two other image detection method by around 10 times, wherein the frame refresh rate is expressed in frame per second (FPS, i.e., the maximum number of picture frames processed per second). The larger the FPS value is, the faster the system can process pictures. Hence, Table 1 proves that the method of speeding up image detection according to the present invention is able to render the system less busy, speed up detection, and enhance detection efficiency greatly. Furthermore, the method of speeding up image detection according to the present invention is applicable to a vehicular system for pedestrian detection or obstacle detection and capable of effectuating instant detection without any additional hardware apparatus.

TABLE 1

Test results of image search speed achieved by Full Search, SURF Local Search and Our System, using conventional pedestrian test databases, respectively.

| test mode/ database | OTCBVS | OTCBVS_2 | CAVIAR_medium | CAVIAR_high | PETS_ frontview | PETS_ sideview |
|---|---|---|---|---|---|---|
| Full Search | 1.28 FPS | 1.28 FPS | 1.28 FPS | 1.29 FPS | 1.30 FPS | 1.28 FPS |
| SURF Local Search | 2.24 FPS | 2.26 FPS | 3.08 FPS | 2.72 FPS | 4.51 FPS | 7.42 FPS |
| Our System | 9.55 FPS | 8.92 FPS | 12.08 FPS | 10.05 FPS | 16.31 FPS | 18.27 FPS |

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A method of speeding up image detection, adapted to increase a speed of detecting a target image, comprising the steps of:
   (1) capturing an image;
   (2) retrieving a plurality of characteristic points of the image;
   (3) creating a region of interest (ROI) centered at the characteristic points each;
   (4) creating a plurality of search point scan windows corresponding to the ROIs, respectively, wherein the creating the plurality of search point scan windows uses coordinates in a vicinity of each of the characteristic points of the ROIs;
   (5) calculating target hit scores of the characteristic points and the search point scan windows;
   (6) comparing the target hit scores of the characteristic points and the search point scan windows to obtain an ROI which has a target image;
   (7) calculating centroid coordinates of a first ROI by a centroid shift weight equation, wherein the calculating the centroid coordinates uses the centroid shift weight equation, based on target hit scores of a characteristic point and search point scan windows of the first ROI and center coordinates of the characteristic point and the search point scan windows; and
   (8) narrowing a scope of ROI search according to a location of the centroid coordinates and a portion of the search point scan windows of the first ROI in a vicinity of the centroid coordinates and reducing a displacement between search points so as to create a second ROI;
   wherein the method conducts a recursive search using at least the steps (7) and (8) with respect to the ROI which has the target image obtained by the step (6) so as to speed up target image detection.

2. The method of speeding up image detection in accordance with claim 1, wherein the step (2) of retrieving a plurality of characteristic points of the image is performed by a speeded up robust features (SURF) algorithm.

3. The method of speeding up image detection in accordance with claim 1, wherein the step (5) of calculating the target hit scores of the characteristic points and the search point scan windows is performed by a support vector machine (SVM) algorithm.

* * * * *